(12) United States Patent
Hsu et al.

(10) Patent No.: US 10,241,495 B2
(45) Date of Patent: Mar. 26, 2019

(54) APPARATUS AND METHOD FOR PROVIDING FEEDBACK FORCE AND MACHINE TOOL SYSTEM

(71) Applicant: Industrial Technology Research Institute, Chutung, Hsinchu County (TW)

(72) Inventors: Chih-Yuan Hsu, Chutung (TW); Shuo-Peng Liang, Chutung (TW); Jui-Ming Chang, Chutung (TW)

(73) Assignee: Industrial Technology Research Institute, Chutung, Hsinchu County (TW)

( * ) Notice: Subject to any disclaimer, the term of this patent is extended or adjusted under 35 U.S.C. 154(b) by 985 days.

(21) Appl. No.: 14/560,408

(22) Filed: Dec. 4, 2014

(65) Prior Publication Data

US 2015/0212510 A1 Jul. 30, 2015

(30) Foreign Application Priority Data

Dec. 25, 2013 (TW) .............................. 102148123 A

(51) Int. Cl.
*G05B 19/401* (2006.01)

(52) U.S. Cl.
CPC .. *G05B 19/401* (2013.01); *G05B 2219/23379* (2013.01); *G05B 2219/37396* (2013.01)

(58) Field of Classification Search
USPC ......................................................... 173/20
See application file for complete search history.

(56) References Cited

U.S. PATENT DOCUMENTS

| 4,208,930 A | 6/1980 | Hermann |
| 4,652,805 A | 3/1987 | Kohn |

(Continued)

FOREIGN PATENT DOCUMENTS

| CN | 1077302 A | 10/1993 |
| CN | 1609745 A | 4/2005 |

(Continued)

OTHER PUBLICATIONS

Chen, *Electricity Monthly*, pp. 66-72 (2008)—English abstract.

(Continued)

*Primary Examiner* — Michelle Lopez
*Assistant Examiner* — Chinyere J Rushing-Tucker
(74) *Attorney, Agent, or Firm* — McCarter & English, LLP; Yu Lu

(57) ABSTRACT

An apparatus for providing a feedback force includes a calculating unit and a force feedback displacement controller. The calculating unit receives relative position information of a first object and a second object and geometric information of the first object and the second object. If the first object and the second object are not in contact, the calculating unit calculates a force feedback value based on the relative position information and the geometric information. The force feedback displacement controller outputs a displacement command, and receives the force feedback value. The displacement command allows the first object to move with respect to the second object. The force feedback displacement controller includes a displacement unit that generates the displacement command based on an operation of a user, and a force feedback unit that provides a feedback force to the displacement unit based on the force feedback value.

41 Claims, 14 Drawing Sheets

(56) References Cited

U.S. PATENT DOCUMENTS

| | | | |
|---|---|---|---|
| 5,882,206 A | | 3/1999 | Gillio |
| 7,191,104 B2 | | 3/2007 | Stewart et al. |
| 8,276,091 B2 | | 9/2012 | Altkorn et al. |
| 8,433,548 B2 | | 4/2013 | Merlhiot |
| 2002/0004688 A1 | * | 1/2002 | Kojima ............... G05B 19/404 700/193 |
| 2002/0010520 A1 | * | 1/2002 | Matsubara ........... G05B 19/414 700/95 |
| 2002/0117987 A1 | * | 8/2002 | Chen ..................... B23Q 5/54 318/569 |
| 2002/0133264 A1 | | 9/2002 | Maiteh et al. |
| 2003/0120376 A1 | * | 6/2003 | Shibata ................. G05B 19/41 700/189 |
| 2004/0128019 A1 | * | 7/2004 | Ikeda ................. G05B 19/4097 700/182 |
| 2005/0154488 A1 | * | 7/2005 | Esterling ........... G05B 19/4065 700/175 |
| 2007/0016325 A1 | * | 1/2007 | Esterling ........... B23Q 17/0961 700/175 |
| 2009/0157218 A1 | * | 6/2009 | Otsuki ................. G05B 19/404 700/188 |
| 2011/0270443 A1 | * | 11/2011 | Kamiya ............... G05B 19/401 700/245 |
| 2013/0116990 A1 | | 5/2013 | Montana et al. |
| 2015/0160646 A1 | * | 6/2015 | Ward ................... G05B 19/401 700/178 |

FOREIGN PATENT DOCUMENTS

| | | |
|---|---|---|
| EP | 2495626 A1 | 9/2012 |
| JP | 962361 | 3/1997 |
| TW | 186566 | 7/1992 |
| TW | 394393 U | 6/2000 |
| TW | 200836875 A | 9/2008 |

OTHER PUBLICATIONS

Lee and Mei, "Development of Parallel Cutting Simulation with Adaptive Octree Model in Virtual Machine Tool," 2012 IEEE/ASME International Conference on Advanced Intelligent Mechatronics, pp. 654-658 (2012).

Liang et al., *J. Mechatronic Industry*, pp. 94-100 (2012)—English abstract.

Liang et al., "Development of the Common Human-Machine Interface for Multi-Axis Machine Tools," 2012 IEEE/ASME International Conference on Advanced intelligent Mechatronics, pp. 650-653 (2012).

Luo et al., *Electricity Monthly*, pp. 24-38 (2010)—English abstract.
Wang and Shen, *J. Mechatronic Industry*, pp. 29-35 (2009)—English abstract.
TW M459585 English abstract.
CN 1077302 English abstract.
CN 1609745 English abstract.
JP 962361 English abstract.
TW 186566 English abstract.
TW I287181 (TW200636408) English abstract.
TW 200836875 English abstract.
TW 201005469 English abstract.
TW 394393 English abstract.
Office Action dated Dec. 1, 2015 in TW 10421645350.
Office Action dated Dec. 16, 2015 in CN 201410038607.9.

* cited by examiner

APPARATUS AND METHOD FOR PROVIDING FEEDBACK FORCE AND MACHINE TOOL SYSTEM

CROSS-REFERENCE TO RELATED APPLICATIONS

This application claims foreign priority under 35 U.S.C. § 119(a) to patent application Ser. No. 10/214,8123, filed on Dec. 25, 2013, in the Intellectual Property Office of Ministry of Economic Affairs, Republic of China (Taiwan, R.O.C.), the entire content of which patent application is incorporated herein by reference and made a part of this specification.

BACKGROUND OF THE INVENTION

1. Technical Field

The present disclosure relates to apparatuses and methods for providing feedback force and related machine tool systems, and, more particularly, to an apparatus and a method for providing feedback force of different strengths according to different distances of objects and a related machine tool system.

2. Description of Related Art

Technology for intelligent machine tools have been put into practice in recent years. Although there is a growing popularity for the automatic mode in which a workpiece is machined in an automatic process, in the calibration and testing of the tools and the workpiece, the manual mode is still necessary. In the manual mode, operating a manual pulse generator (MPG) is a common and convenient approach. However, in a complex multi-axis machine tool, axial movement in space is less intuitive, and/or the whole aspect of the motion space is not available due to obscured sight, and the risk of collision is increased when the objects are moved by operating the MPG.

SUMMARY OF THE INVENTION

The present disclosure provides a method and an apparatus for providing a feedback force of different strengths according to the different distances of objects and a related machine tool system, thereby increasing awareness of a user operating a manual pulse generator (MPG) to reduce the risk of collision.

In an embodiment, the present disclosure provides a machine tool system, which may include: a tool holder arranged to hold a tool; a base arranged to carry a workpiece; a control unit arranged to control relative movements of the tool holder and the base based on a displacement command, and to output relative position information of the tool holder and the base; a storage unit arranged to store geometric information of the tool holder and the base; a calculating unit electrically connected with the control unit and the storage unit and arranged to receive the relative position information of the tool holder and the base and the geometric information of the tool holder and the base, and to calculate a force feedback value based on the relative position information of the tool holder and the base and the geometric information of the tool holder and the base when the tool holder is not in contact with the base; and a force feedback displacement controller electrically connected with the control unit and the calculating unit and arranged to output the displacement command, and to receive the force feedback value, the force feedback displacement controller including: a manual pulse generator configured to generate the displacement command based on an operation of a user; and a force feedback unit coupled with the manual pulse generator and configured to provide a feedback force to the manual pulse generator based on the force feedback value.

In an embodiment, the present disclosure provides an apparatus for providing a feedback force, which may include: a calculating unit arranged to receive relative position information of a first object and a second object and geometric information of the first object and the second object, and to output a force feedback value based on the relative position information of the first object and the second object and the geometric information of the first object and the second object if the first object and the second object are not in contact; and a force feedback displacement controller electrically connected with the calculating unit and arranged to output a displacement command, and to receive the force feedback value, the displacement command allowing the first object to move with respect to the second object, the force feedback displacement controller including: a displacement unit configured to generate the displacement command based on an operation of a user; and a force feedback unit coupled with the displacement unit and configured to provide a feedback force to the displacement unit based on the force feedback value.

In yet another embodiment, the present disclosure provides a method for providing a feedback force, which may include the following steps of: receiving, by using a calculating unit, relative position information of a first object and a second object and geometric information of the first object and the second object; outputting, by using a displacement unit of a force feedback displacement controller, a displacement command to allow the first object to move with respect to the second object; calculating and outputting, by using the calculating unit, a force feedback value based on the relative position information of the first object and the second object and the geometric information of the first object and the second object to the force feedback displacement controller if the first object and the second object are not in contact; and providing, by using a force feedback unit coupled with the displacement unit, a feedback force to the displacement unit based on the force feedback value.

DETAILED DESCRIPTION OF THE INVENTION

Figure 1:
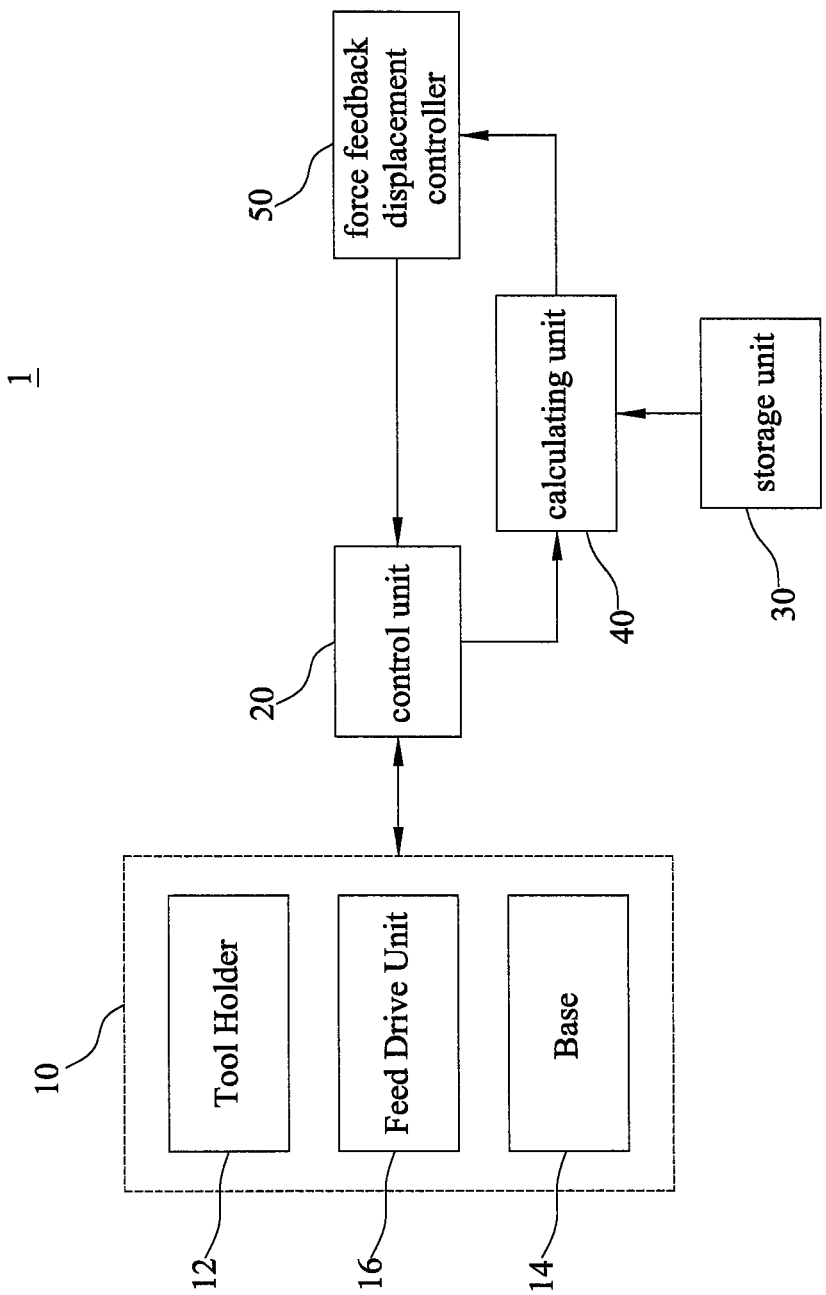
FIG. 1 is a schematic diagram illustrating a system architecture according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

First Embodiment

Figure 2:
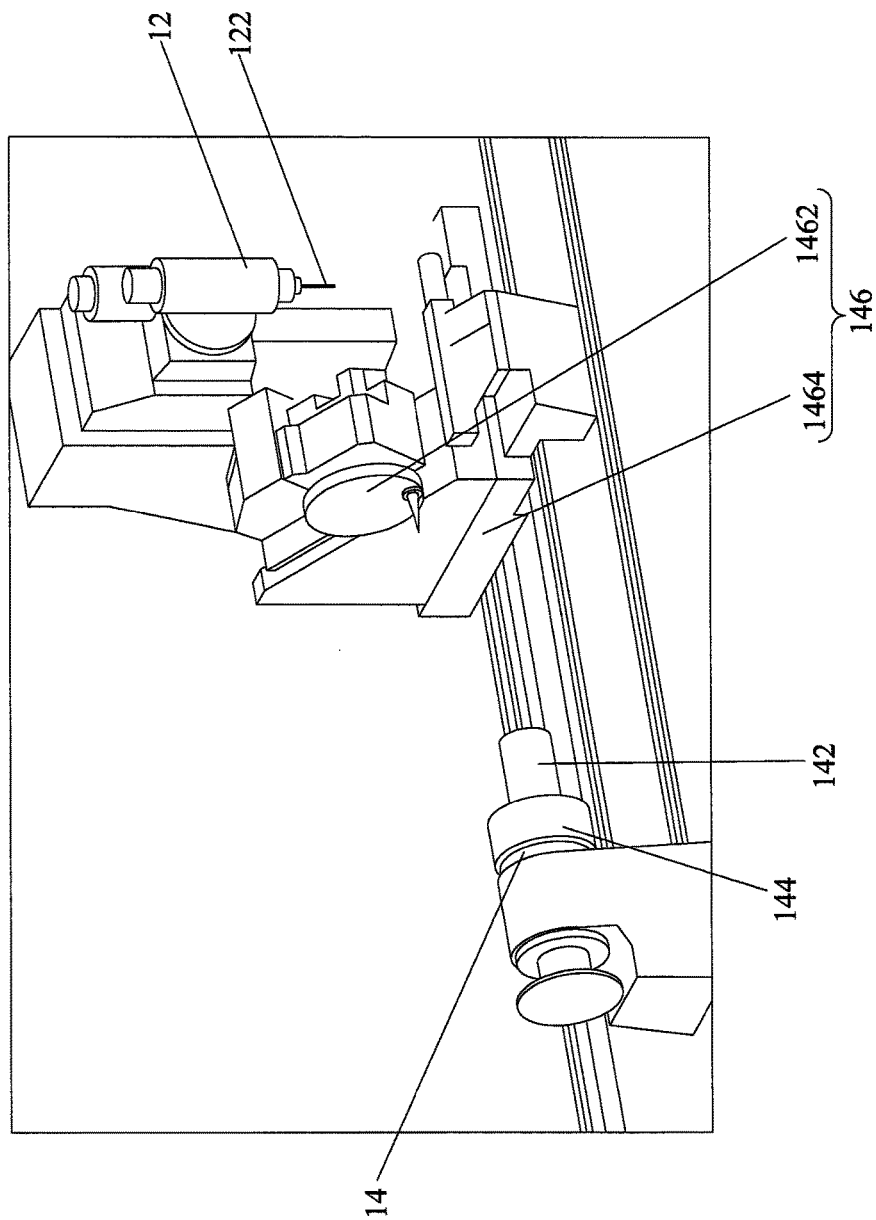
FIG. 2 is a perspective view of a machine tool according to the present disclosure.
Figure 3B:
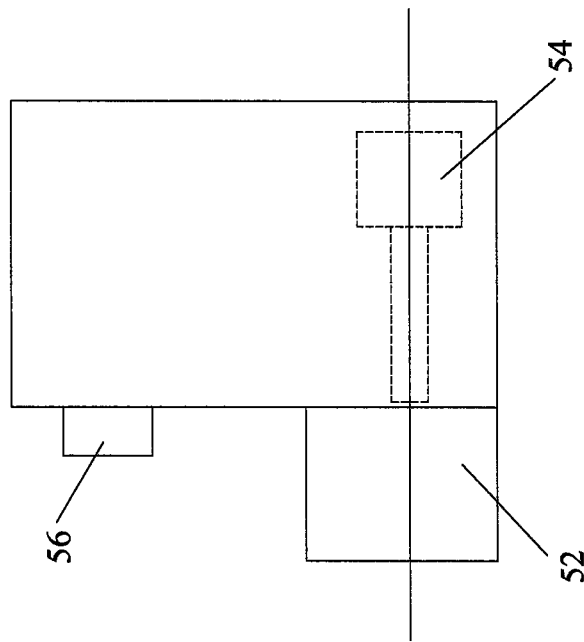
FIG. 3B is a side view of the force feedback displacement controller according to the present disclosure.
Figure 3A:
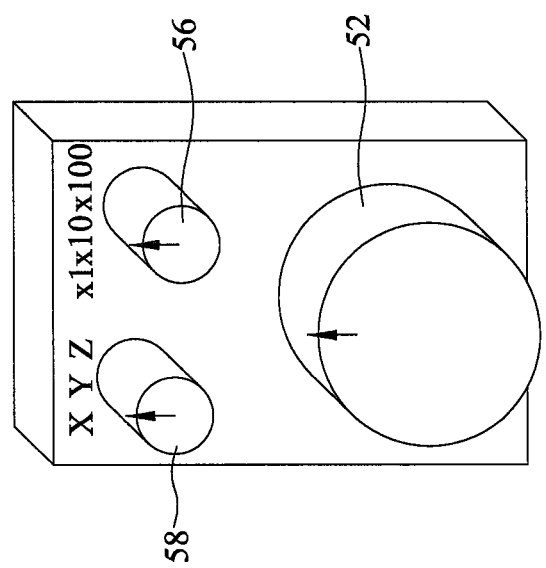
FIG. 3A is a perspective view of a force feedback displacement controller according to the present disclosure.

FIG. 1 is a schematic diagram illustrating the system architecture of a first embodiment according to the present disclosure. FIG. 2 is a perspective view of a machine tool 10 according to the present disclosure. FIGS. 3A and 3B are perspective view and side view of a force feedback displacement controller according to the present disclosure, respectively. A machine tool system 1 includes a tool holder 12, a base 14, a control unit 20, a storage unit 30, a calculating unit 40, and a force feedback displacement controller 50. The calculating unit 40 is electrically connected with the control unit 20, the storage unit 30 and the force feedback displacement controller 50. The control unit 20 is electrically connected with the force feedback displacement controller 50. The tool holder 12 and the base 14 are provided on the machine tool 10, for example. The machine tool 10 may further include a feed drive unit 16 that drives the tool holder 12 and base 14 to move with respect to each other. The feed drive 16 can be a motor, for example. The tool holder 12 is connectable to a tool 122. The base 14 is suitable for carrying a workpiece 142. The control unit 20 is, for example, a controller that controls relative movements of the tool holder 12 and the base 14 in accordance with a displacement command, and generates and outputs the relative position information of the tool holder 12 and the base 14 to the calculating unit 40. Moreover, the control unit 20 is, for example, electrically connected to the feed drive unit 16, and controls the feed drive unit 16 to drive the tool holder 12 and the base 14 to move with respect to each other. Furthermore, the control unit 20 generates the relative position information of the tool holder 12 and the base 14 by, for example, reading the numerical values of the encoders of the tool holder 12 and the base 14. The storage unit 30 is, for example, a memory, a CD, or a remote or networked storage media for storing and outputting geometric information of the tool holder 12 and the base 14 to the calculating unit 40. The geometric information is, for example, 3D model files. The calculating unit 40 is, for example, a CPU or a chip for receiving the relative position information and the geometric information of the tool holder 12 and the base 14. The force feedback displacement controller 50 includes a manual pulse generator (MPG) 52 and a force feedback unit 54. The MPG 52 generates displacement commands in accordance with the operations of a user (such as rotating the MPG 52). The force feedback unit 54 is coupled to the MPG 52, and provides a force feedback to the MPG 52 based on a force feedback value, such that the user feels a corresponding feedback force when operating the MPG 52.

Figure 4A:
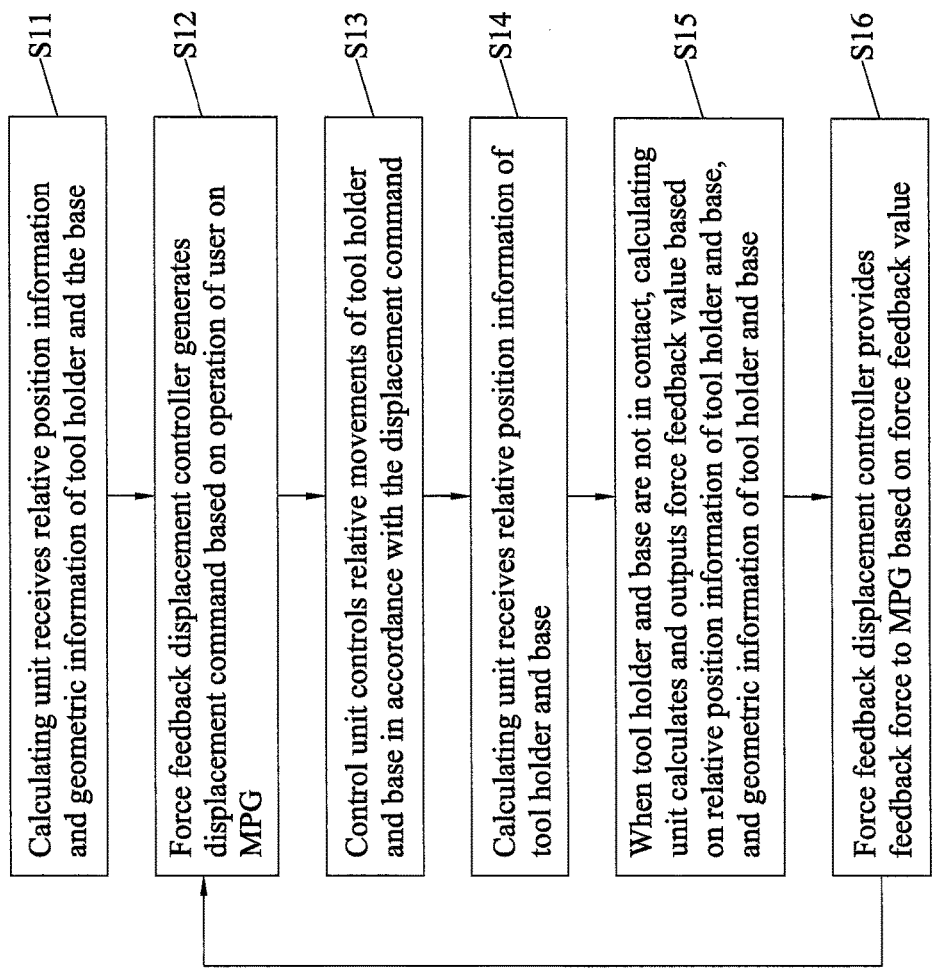
FIG. 4A is a flowchart illustrating the first embodiment according to the present disclosure.

Referring now to FIG. 4A, a flowchart illustrating the first embodiment according to the present disclosure is shown.

In step S11, the calculating unit 40 receives the relative position information and the geometric information of the tool holder 12 and the base 14.

In step S12, the force feedback displacement controller 50 generates and outputs a displacement command based on an operation of the user on the MPG 52 to the control unit 20.

In step S13, the control unit 20 controls the relative movements of the tool holder 12 and the base 14 in accordance with the above displacement command.

In step S14, the calculating unit 40 receives the relative position information of the tool holder 12 and the base 14.

In step S15, when the tool holder 12 and the base 14 are not in contact, the calculating unit 40 calculates and outputs a force feedback value $T_f$ to the force feedback displacement controller 50 based on the relative position information of the tool holder 12 and the base 14, and the geometric information of the tool holder 12 and the base 14.

In step S16, the force feedback displacement controller 50 provides a feedback force to the MPG 52 based on the force feedback value $T_f$.

When the user operates the MPG 52 of the force feedback displacement controller 50 again to allow the tool holder 12 and the base 14 to move with respect to each other, the machine tool system 1 repeats the aforementioned steps S12-S16.

In an embodiment, the calculating unit 40, for example, calculates the shortest distance between the tool holder 12 and the base 14 based on the relative position information of the tool holder 12 and base 14, and the geometric information of the tool holder 12 and the base 14, and uses the shortest distance as a distance computed value $DC_{min}$ to calculate the force feedback value $T_f$. The distance computed value $DC_{min}$ and the force feedback value $T_f$ have, for example, an inverse association. That is, the less the distance computed value $DC_{min}$ is, the greater the force feedback value $T_f$ becomes.

In another embodiment, the calculating unit 40 calculates the force feedback value $T_f$ based on the distance computed value $DC_{min}$, a distance threshold $D_h$, and a maximum force feedback value $T_{max}$ that can be provided by the force feedback unit 54 to the MPG 52. The distance threshold $D_h$ lessens potential problems that might be caused in the case of a very large or zero distance computed value $DC_{min}$.

Figure 4B:
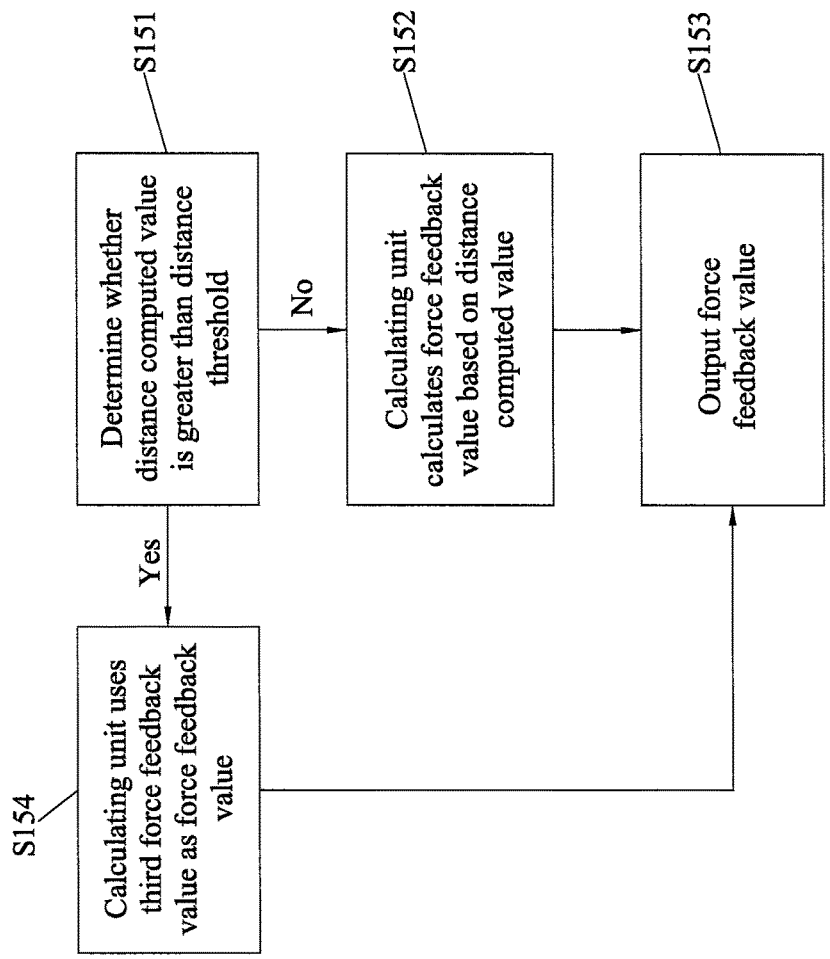
FIG. 4B is a detailed flowchart illustrating how the force feedback value $T_f$ is calculated and outputted in accordance with the present disclosure.

Referring to FIG. 4B, a detailed flowchart illustrating how the force feedback value $T_f$ is calculated and outputted in accordance with the present disclosure is shown.

In step S151, if the calculating unit 40 determines that a distance computed value $DC_{min}$ is not greater (i.e., less than or equal to) a distance threshold $D_h$, proceed to step S152; else, proceed to step S154.

In step S152, the calculating unit 40 calculates the force feedback value $T_f$ based on the distance computed value $DC_{min}$. The relation between the distance computed value $DC_{min}$, the distance threshold $D_h$, a normalized distance difference D, the maximum force feedback value $T_{max}$ are as follow:

$$T=C^*D^\gamma=T_f/T_{max} \qquad \text{Eq. (1)}$$

$$D=(D_h-DC_{min})/D_h \qquad \text{Eq. (2)}$$

wherein $0 \le D$ since the distance computed value $DC_{min}$ is less than or equal to the distance threshold $D_h$; C is a constant with a value greater than 0 and less than or equal to 1 (i.e., $0<C\le1$); and γ is a constant with a value greater than or equal to 1 (i.e., $1\le\gamma$).

Since $DC_{mm}$, $T_{max}$, $D_h$, C, and γ are known, the calculating unit 40 can calculate the force feedback value $T_f$.

Figure 5:
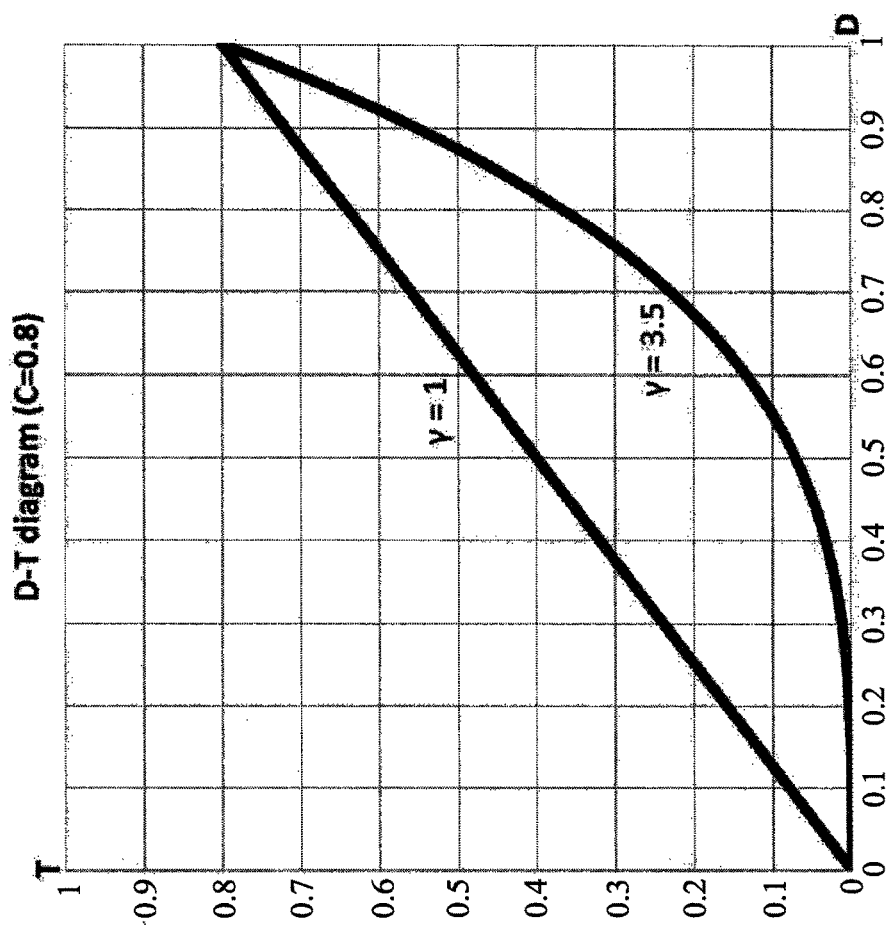
FIG. 5 is a drawing depicting the relationship between a normalized distance difference D and a normalized force feedback value T in an embodiment of the present disclosure.

In step S153, the calculating unit 40 outputs the force feedback value $T_f$, and this is reflected on the MPG 52 to provide the user a sensation of "the closer the shortest distance between the tool holder 12 and the base 14, the greater the feedback force generated on the MPG 52." In other words, the distance computed value $DC_{min}$ and the force feedback value $T_f$ have an inverse association. Referring to FIG. 5, a drawing depicting the relation between the normalized distance difference D and the normalized force feedback value T when C=0.8 and γ are 1 and 3.5, respectively, is shown.

In step S154, if the calculating unit 40 determines that the distance computed value $DC_{min}$ is greater than the distance threshold $D_h$, the distance between the tool holder 12 and the base 14 can be regarded as very large, so the calculating unit 40 can just use a constant third force feedback value $T_3$ as the force feedback value $T_f$. The third force feedback value $T_3$ is, for example, zero or a value that is far less than the maximum force feedback value $T_{max}$ so as to reduce the influence of the MPG 52 on the user.

Second Embodiment

Figure 6:
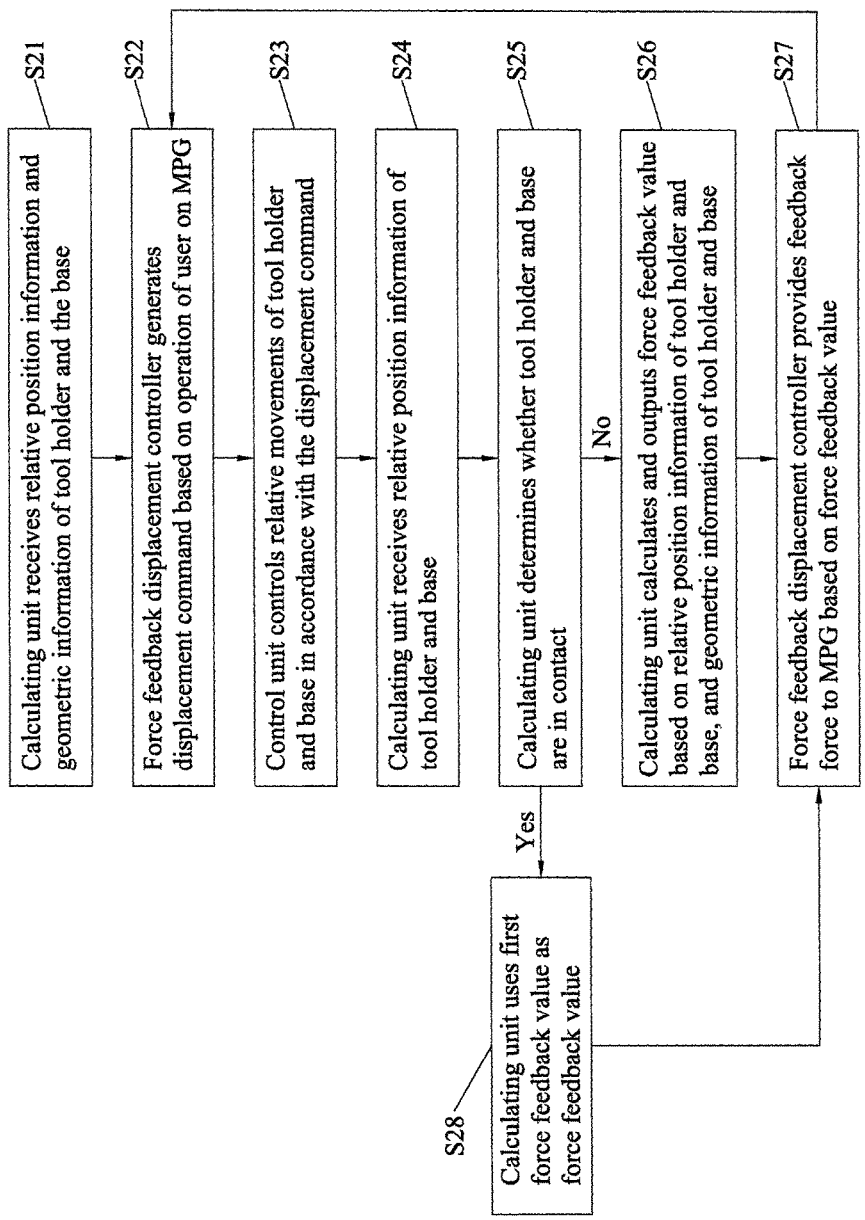
FIG. 6 is a flowchart illustrating a second embodiment according to the present disclosure.

Referring to FIG. 6, a flowchart illustrating a second embodiment according to the present disclosure is shown. Since steps S21-S24, S26, and S27 of the second embodiment are similar to the steps S11-S14, S15, and S16 of the first embodiment, respectively, only the differences are described as follow.

In step S25, the calculating unit 40 determines whether the tool holder 12 and the base 14 are in contact. The calculating unit 40, for example, determines whether the tool holder 12 and the base 14 interfere based on the relative position information of the tool holder 12 and the base 14, and the geometric information of the tool holder 12 and the base 14. If the calculating unit 40 determines that the tool holder 12 and the base 14 are not in contact, then proceed to step S26; else, proceed to step S28.

In step S28, since the tool holder 12 and the base 14 are in contact, the calculating unit 40 uses a constant first force feedback value $T_1$ as the force feedback value $T_f$, then proceeds to step S27. The first force feedback value $T_1$ can be, for example, slightly less than or equal to the maximum force feedback value $T_{max}$, such that it would be difficult for the user to turn the MPG 52, thereby warning the user that the tool holder 12 and the base 14 are in contact, and thus avoiding the tool holder 12 and the base 14 to move further into each other.

Third Embodiment

Figure 7:
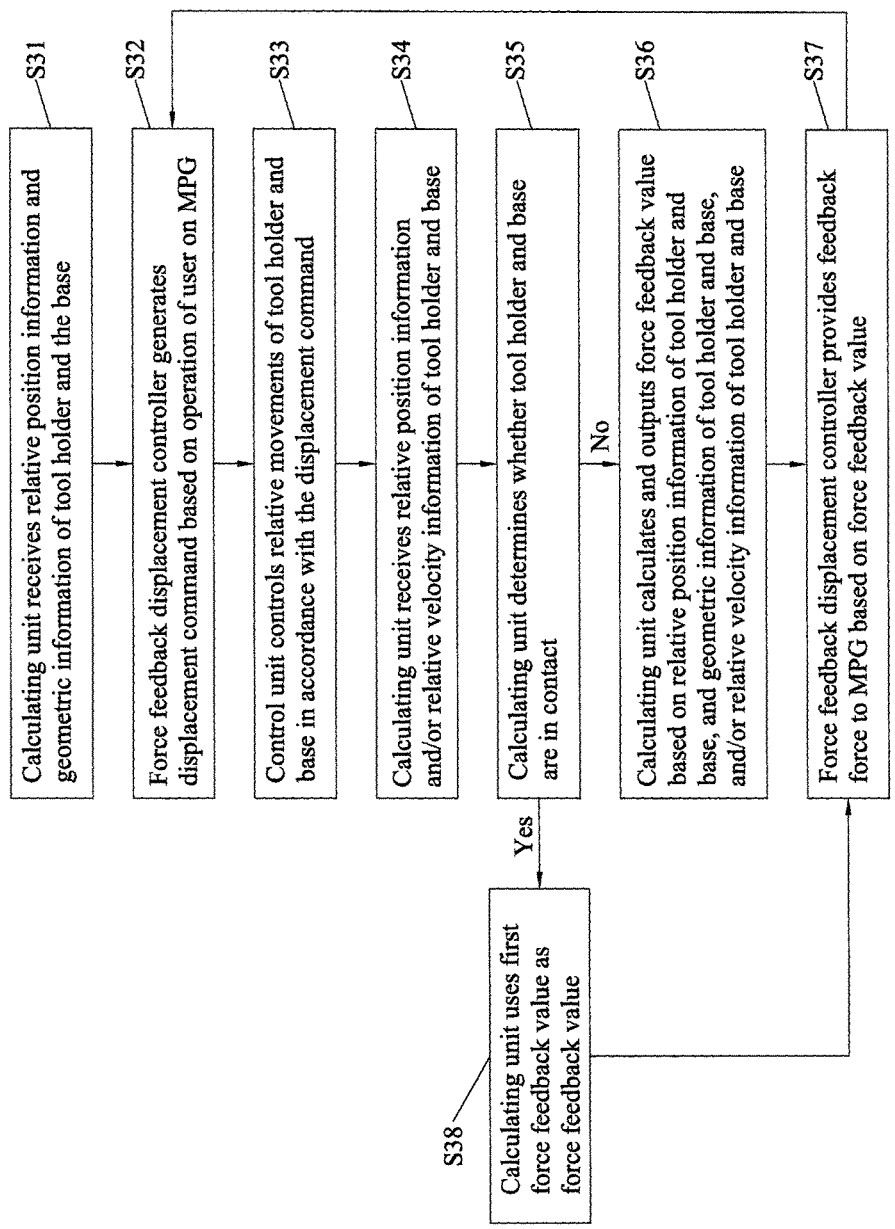
FIG. 7 is a flowchart illustrating a third embodiment according to the present disclosure.

Referring to FIG. 7, a flowchart illustrating a third embodiment according to the present disclosure is shown. Since steps S31-S35, S37 and S38 of the third embodiment are similar to the steps S21-S25, S27, and S28 of the second embodiment, respectively, only the differences are described as follow.

In step S36, the calculating unit 40 calculates and outputs the force feedback value $T_f$ based on the relative position information and the geometric information of the tool holder 12 and the base 14, and/or the relative velocity information of the tool holder 12 and the base 14.

In an embodiment, the calculating unit 40 calculates and outputs the force feedback value $T_f$ based on the relative position information and the geometric information of the tool holder 12 and the base 14. The calculation method is similar to the first embodiment, and thus will not be described here.

In another embodiment, the calculating unit 40 calculates and outputs the force feedback value $T_f$ based on the relative velocity information $V_p$ of the tool holder 12 and the base 14 on a motion axis. Also refer to FIG. 3A. The force feedback displacement controller 50 further includes a motion axis setup unit 58 for selecting a motion axis. The relation between the relative velocity information $V_p$, a maximum possible velocity on this motion axis $V_{max}$, a normalized velocity V, the maximum force feedback value $T_{max}$, the force feedback value $T_f$, and a normalized force feedback value T are as follow:

$$T=C^*V^\gamma=T_f/T_{max} \qquad \text{Eq. (3)}$$

$$V=V_p/V_{max} \qquad \text{Eq. (4)}$$

wherein C is a constant with a value greater than 0 and less than or equal to 1 (i.e., $0<C\le1$); and γ is a constant with a value greater than or equal to 1 (i.e., $1\le\gamma$).

Figures 8A, 8B:
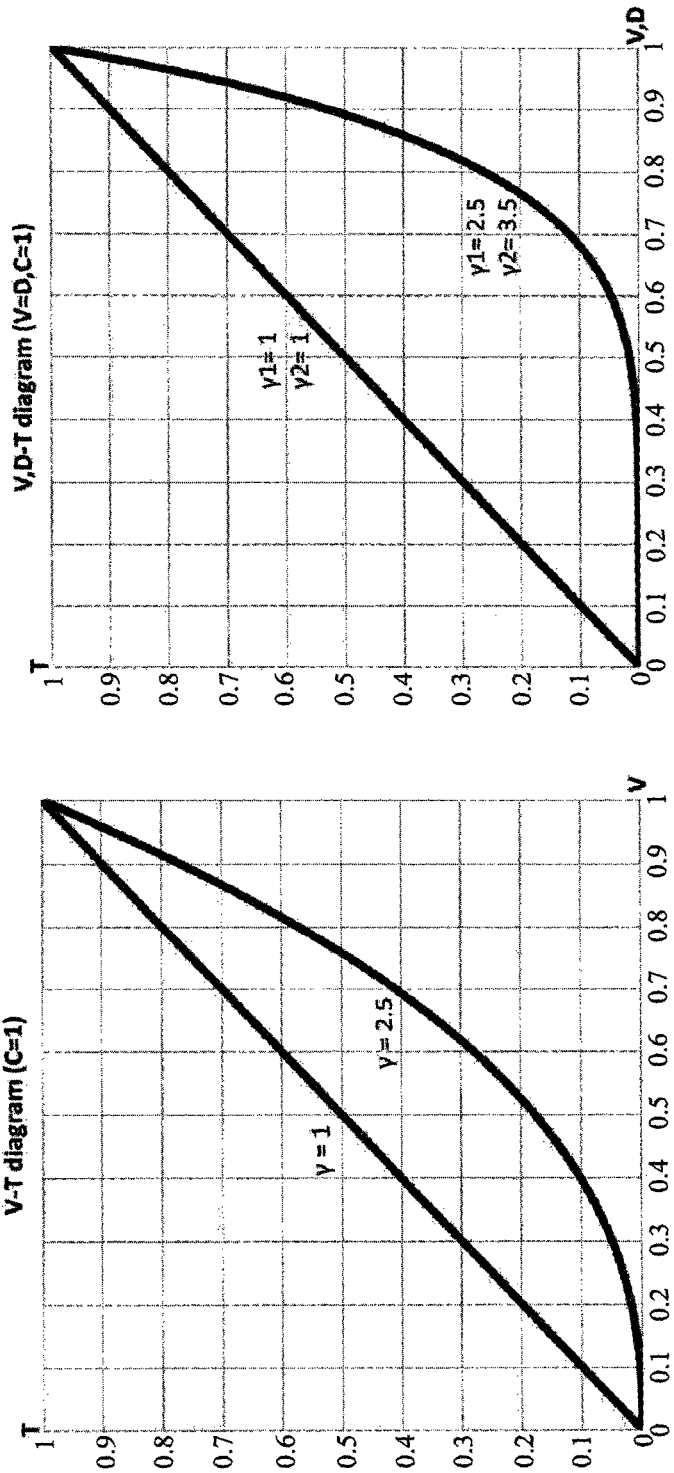
FIG. 8A is a drawing depicting the relationship between a normalized velocity V and the normalized force feedback value T in another embodiment of the present disclosure.
FIG. 8B is a drawing depicting the relationship between the normalized distance difference D, the normalized velocity V and the normalized force feedback value T in still another embodiment of the present disclosure.

Since $V_p$, $V_{max}$, $T_{max}$, C, and γ are known, the calculating unit 40 can then calculate the force feedback value $T_f$, which is reflected on the MPG 52 to provide the user a sensation of "the faster the relative velocity between the tool holder 12 and the base 14, the greater the feedback force generated on the MPG 52." In other words, the relative velocity information $V_p$ of the tool holder 12 and the base 14 and the force feedback value $T_f$ have a positive association. Referring to FIG. 8A, a drawing depicting the relation between the normalized velocity V and the normalized force feedback value T when C=1 and γ are 1 and 2.5, respectively, is shown.

In yet another embodiment, the calculating unit 40 calculates the shortest distance between the tool holder 12 and the base 14 based on the relative position information of the tool holder 12 and the base 14 and the geometric information of the tool holder 12 and the base 14 as the distance computed value $DC_{min}$, and combines the shortest distance with the relative velocity information $V_p$ of tool holder 12 and the base 14 to calculate and output the force feedback value $T_f$.

If the calculating unit 40 determines that the distance computed value $DC_{min}$ is less than or equal to a distance threshold $D_h$, the relation between the distance computed value $DC_{min}$, the distance threshold $D_h$, the relative velocity information $V_p$, a maximum possible velocity on this motion axis $V_{max}$, the maximum force feedback value $T_{max}$, the force feedback value $T_f$, and a normalized force feedback value T are as follow:

$$T=C^*V^{\gamma 1}*D^{\gamma 2}=T_f/T_{max} \qquad \text{Eq. (5)}$$

wherein the definition of a normalized distance difference D is the same as that in Eq. (2); and the definition of a normalized velocity V is the same as that in Eq. (4). Since the distance computed value $DC_{min}$ is less than or equal to a distance threshold $D_h$, $0 \leq D$; C is a constant with a value greater than 0 and less than or equal to 1 (i.e., $0 < C \leq 1$); $\gamma 1$ is a constant with a value greater than or equal to 1 (i.e. $1 \leq \gamma 1$); and $\gamma 2$ is a constant with a value greater than or equal to 1 (i.e., $1 \leq \gamma 2$). Since $DC_{min}$, $D_h$, $V_p$, $V_{max}$, $T_{max}$, C, $\gamma 1$ and $\gamma 2$ are already known, the calculating unit 40 can then calculate the force feedback value $T_f$, which is reflected on the MPG 52 to provide the user a sensation of "the shorter the shortest distance and the faster the relative velocity between the tool holder 12 and the base 14, the greater the feedback force generated on the MPG 52." In other words, the distance computed value $DC_{min}$ and the force feedback value $T_f$ have an inverse association, and the relative velocity information $V_p$ of the tool holder 12 and the base 14 and the force feedback value $T_f$ have a positive association. Referring to FIG. 8B, a drawing depicting the relation between the normalized distance difference D, the normalized velocity V and the normalized force feedback value T when V=D, C=1, $\gamma 1$ are 1 and 2.5 and $\gamma 2$ are 1 and 3.5, respectively, is shown.

If the calculating unit 40 determines that the distance computed value $DC_{min}$ is greater than the distance threshold $D_h$, the distance between the tool holder 12 and the base 14 can be regarded as very large, so the calculating unit 40 can just use a constant third force feedback value $T_3$ as the force feedback value $T_f$. The third force feedback value $T_3$ is, for example, zero or a value that is far less than the maximum force feedback value $T_{max}$ so as to reduce the influence of the MPG 52 on the user. The calculating unit 40 may also, instead, use the relative velocity information $V_p$ and Eqs. (3) and (4) to calculate the force feedback value $T_f$.

Fourth Embodiment

Figure 9:
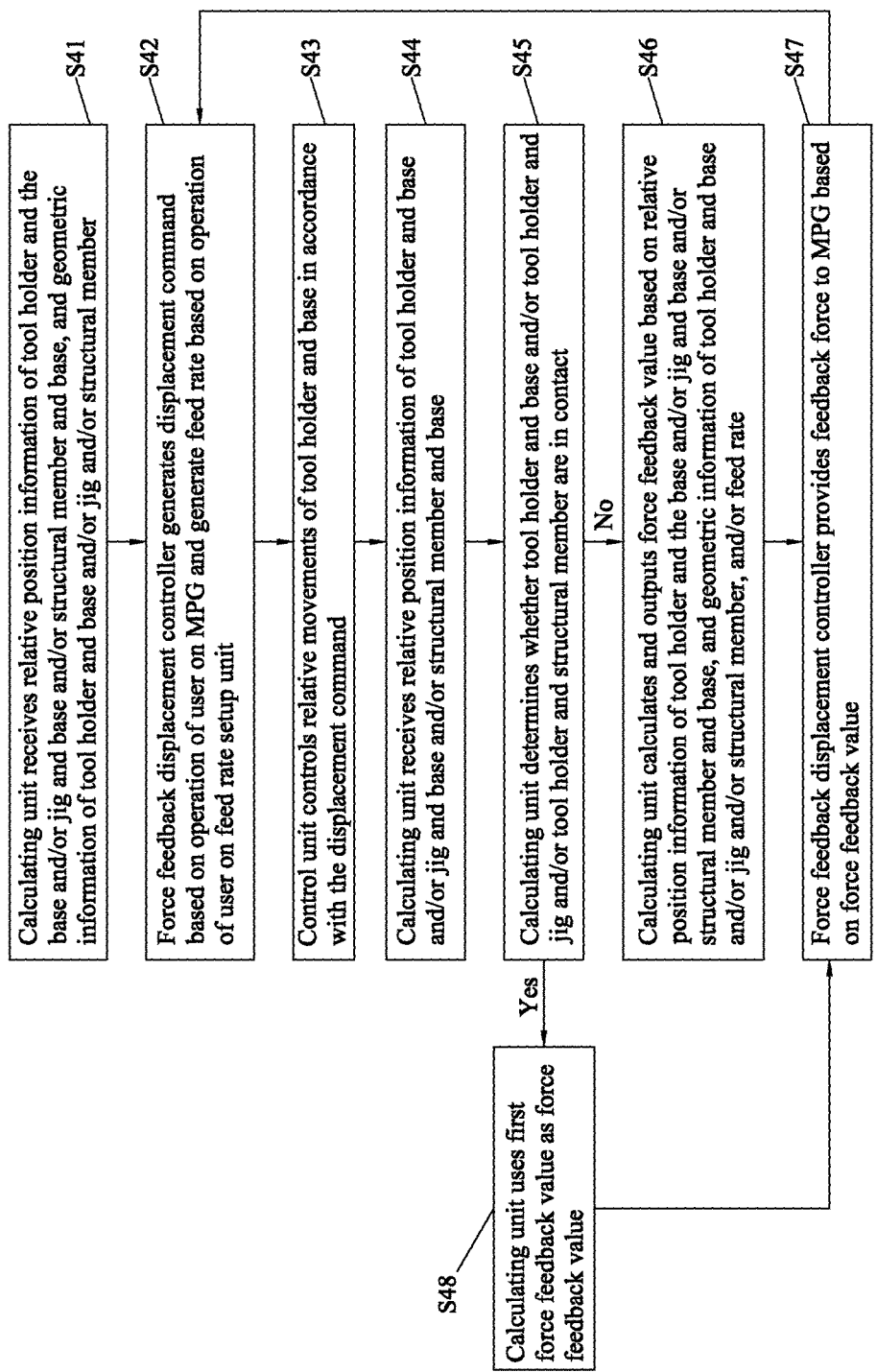
FIG. 9 is a flowchart illustrating a fourth embodiment according to the present disclosure.

Referring to FIG. 9, a flowchart illustrating a fourth embodiment of the present disclosure is shown. The steps of the fourth embodiment are similar to those of the second embodiment except for the following differences.

In step S41, the calculating unit 40 receives the relative position information of the tool holder 12 and the base 14; and/or a jig 144 and the base 14; and/or a structural member 146 and the base 14, and the geometric information of the tool holder 12 and the base 14, and/or the jig 144 and/or structural member 146 stored in the storage unit 30. In other words, the fourth embodiment not only takes into account the tool holder 12 and the base 14, but also considers one or both of the jig 144 and the structural member 146. Referring to FIG. 2 at the same time, the jig 144 is provided on the base 14, and is fixed relative to the base 14. The structural member 146 is, for example, a turret (1462), a bellows (not shown), a sheet metal cover (1464) or an automatic tool change machine (not shown), and is provided on the machine tool 10 and moves with respect to the base 14.

In step S42, the force feedback displacement controller 50 generates and outputs a displacement command based on an operation of the user on the MPG 52 and/or a feed rate command based on an operation of the user on a feed rate setup unit 56 to the control unit 20. Referring to FIG. 3A at the same time, the force feedback displacement controller 50 further includes a feed rate setup unit 56 for selecting a feed rate setting.

In step S44, the calculating unit 40 receives the relative position information of the tool holder 12 and the base 14; and/or the jig 144 and the base 14; and/or the structural member 146 and the base 14.

In step S45, the calculating unit 40 determines whether the tool holder 12 and the base 14; and/or the tool holder 12 and the jig 144; and/or the tool holder 12 and the structural member 146 are in contact.

In step S45, the calculating unit 40 may determine whether the tool holder 12 is in contact with any one of the following elements: the base 14, the jig 144 and the structural member 146. In an embodiment, the calculating unit 40, for example, determines whether the tool holder 12 and the base 14, or the tool holder 12 and the jig 144 interfere based on the relative position information of the tool holder 12 and the base 14 and the relative position information of the tool holder 12 and the jig 144, and the geometric information of the tool holder 12, the base 14 and the jig 144. If the calculating unit 40 determines that any one pair of the tool holder 12 and the base 14, and the tool holder 12 and the jig 144 are in contact, then proceed to step S48; else, proceed to step S46.

In another embodiment, the calculating unit 40, for example, determines whether the tool holder 12 and the base 14, or the tool holder 12 and the structural member 146 interfere based on the relative position information of the tool holder 12 and the base 14 and the relative position information of the tool holder 12 and the structural member 146, and the geometric information of the tool holder 12, the base 14 and the structural member 146. If the calculating unit 40 determines that any one pair of the tool holder 12 and the base 14, and the tool holder 12 and the structural member 146 are in contact, then proceed to step S48; else, proceed to step S46.

In step S46, the calculating unit 40 calculates and outputs the force feedback value $T_f$ based on the relative position information of the tool holder 12 and the base 14; and/or the jig 144 and the base 14; and/or the structural member 146 and the base 14, and the geometric information of the tool holder 12 and the base 14 and/or the jig 144 and/or the structural member 146, and/or the feed rate.

In an embodiment, the calculating unit 40, for example, calculates the shortest distance between the tool holder 12 and the base 14, and the shortest distance between the tool holder 12 and the jig 144 based on the relative position information of the tool holder 12 and the base 14, and the relative position information of the tool holder 12 and the jig 144, and the geometric information of the tool holder 12, the base 14 and the jig 144; the calculating unit 40 further selects the shorter one of the two shortest distances as the distance computed value $DC_{min}$.

In another embodiment, the calculating unit 40, for example, calculates the shortest distance between the tool holder 12 and the base 14, and the shortest distance between the tool holder 12 and the structural member 146 based on the relative position information of the tool holder 12 and the base 14, and the relative position information of the tool holder 12 and the structural member 146, and the geometric information of the tool holder 12, the base 14 and the structural member 146; the calculating unit 40 further selects the shorter one of the two shortest distances as the distance computed value $DC_{min}$.

If the calculating unit 40 determines that the distance computed value $DC_{min}$ is less than or equal to a distance threshold $D_h$, the calculating unit 40 calculates the force feedback value $T_f$ based on the distance computed value $DC_{min}$, distance threshold $D_h$, a maximum force feedback value $T_{max}$, and Eqs. (1) and (2), and this is reflected on the MPG 52.

In yet another embodiment, the calculating unit 40 further adjusts the force feedback value $T_f$ based on the feed rate, and the feed rate and the adjusted force feedback value $T_f$ have a positive association. For example, when the feed rate setting is 1 mm, one increment of the MPG 52 indicates 1 mm, and the force feedback value $T_f$ at this time is X; when the feed rate setting is 10 mm, one increment of the MPG 52 indicates 10 mm, and now the calculating unit 40 adjusts the force feedback value $T_f$ to become 10*X since the feed rate setting is increased. On the contrary, if the feed rate setting is decreased, the force feedback value $T_f$ becomes less. It is all to achieve the effect of warning when the user is operating on the MPG 52.

If the calculating unit 40 determines that the distance computed value $DC_{min}$ is greater than the distance threshold $D_h$, the distance between the tool holder 12 and the base 14 can be regarded as very large, so the calculating unit 40 can just use a constant third force feedback value $T_3$ as the force feedback value $T_f$. The third force feedback value $T_3$ is, for example, zero or a value that is far less than the maximum force feedback value $T_{max}$ so as to reduce the influence of the MPG 52 on the user.

Fifth Embodiment

Figure 10:
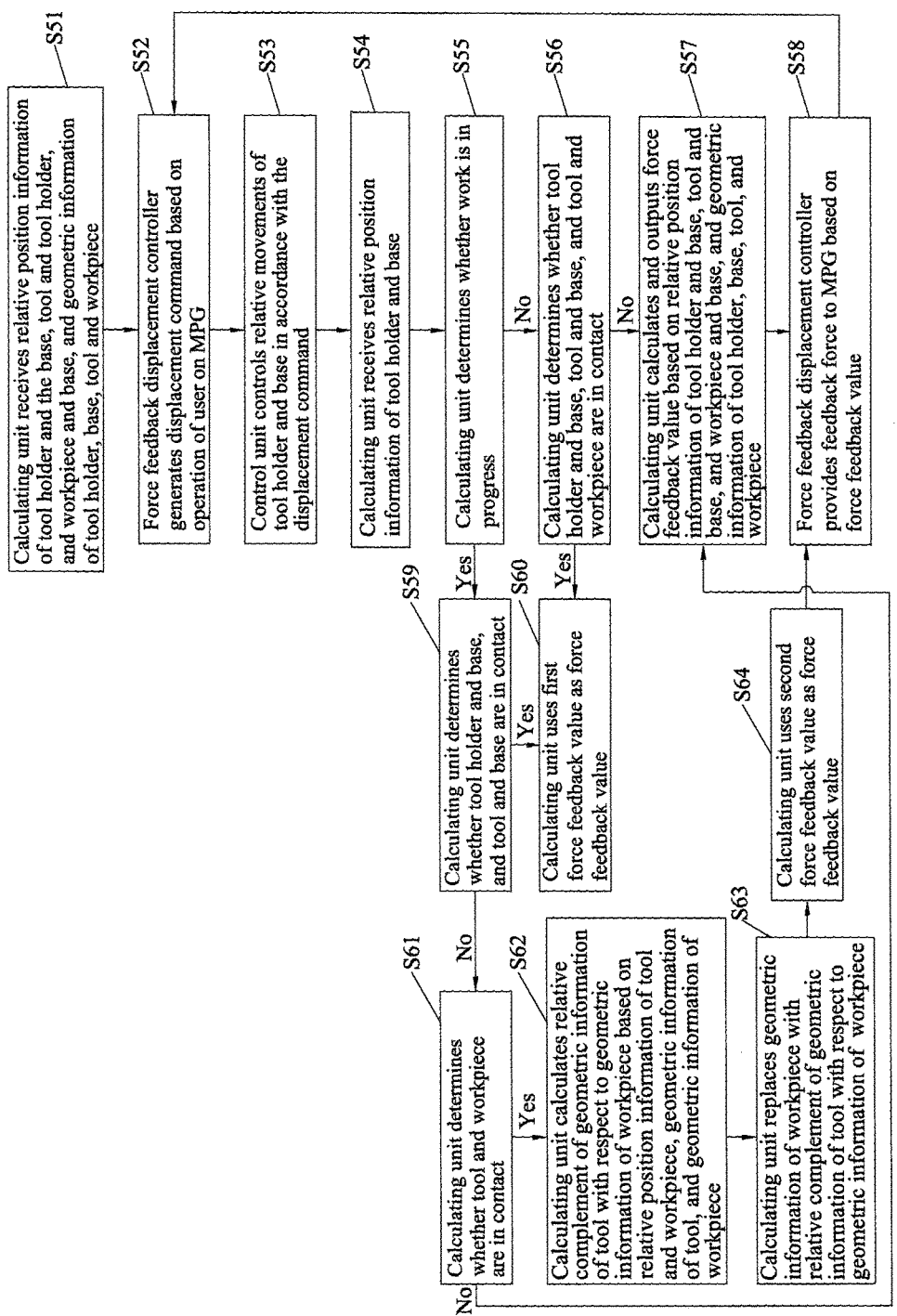
FIG. 10 is a flowchart illustrating a fifth embodiment according to the present disclosure.

Referring to FIG. 10, a flowchart illustrating a fifth embodiment of the present disclosure is shown. Since steps S52-S54, S58 and S60 of the fifth embodiment are similar to the steps S22-S24, S27, and S28 of the second embodiment, respectively, only the differences are described as follow.

In step 51, the calculating unit 40 receives the relative position information of the tool holder 12 and the base 14; the tool 122 and the tool holder 12, and the workpiece 142 and the base 14, and the geometric information of the tool holder 12, the base 14, tool 122 and the workpiece 142 stored in the storage unit 30. When the machine tool system 1 has not started the process, the calculating unit 40 further uses initial geometric information of the workpiece 142 as the geometric information of the workpiece 142.

In step S55, the calculating unit 40 further determines whether the machine tool system 1 is carrying out a process (e.g., whether the tool holder 12 is rotating). If the machine tool system 1 is not carrying out a process, then proceed to step S56; else, proceed to step S59.

In step S56, the calculating unit 40 determines whether the tool holder 12 and the base 14; the tool 122 and the base 14; and the tool 122 and the workpiece 142 are in contact. The calculating unit 40, for example, determines whether the tool holder 12 and the base 14; the tool 122 and the base 14; and the tool 122 and the workpiece 142 interfere based on the relative position information of the tool holder 12 and the base 14; the relative position information of the tool 122 and the base 14; and the relative position information of the tool 122 and the workpiece 142, and the geometric information of the tool holder 12, the base 14, the tool 122 and the workpiece 142. If the calculating unit 40 determines that any one pair of the tool holder 12 and the base 14; the tool 122 and the base 14; and the tool 122 and the workpiece 142 are in contact, proceed to step S60; else, proceed to step S57.

In step S57, the calculating unit 40 calculates and outputs the force feedback value $T_f$ based on the relative position information of the tool holder 12 and the base 14; the tool 122 and the base 14; and the workpiece 142 and the base 14, and the geometric information of the tool holder 12, the base 14, the tool 122, and the workpiece 142. The relative position information of the tool holder 12 and the base 14; the tool 122 and the base 14; and the workpiece 142 and the base 14 can also be simplified to just the relative position information of the tool 122 and the workpiece 142. The calculating unit 40 calculates the shortest distance between the tool 122 and the base 14, and the shortest distance between the tool 122 and the workpiece 142. The calculating unit 40 further selects the shorter of the two shortest distances as the distance computed value $DC_{min}$.

In step S59, the calculating unit 40 further determines whether the tool holder 12 and the base 14; and the tool 122 and the base 14 are in contact. If any one pair of the tool holder 12 and the base 14, and the tool 122 and the base 14 is in contact, proceed to step S60; else, proceed to step S61.

In step S61, the calculating unit 40 further determines whether the tool 122 and the workpiece 142 are in contact. If the tool 122 and the workpiece 142 are in contact, proceed to step S62; else, proceed to step S57.

In step S62, the calculating unit 40 calculates a relative complement of the geometric information of the tool 122 with respect to the geometric information of the workpiece 142 (i.e., the left over portion of the workpiece 142 after being cut by the tool 122) based on the relative position information of the tool 122 and the workpiece 142, the geometric information of the tool 122, and the geometric information of the workpiece 142.

In step S63, the calculating unit 40 replaces previous geometric information of the workpiece 142 with the relative complement of the geometric information of the tool 122 with respect to the geometric information of the workpiece 142.

In step S64, the calculating unit 40 uses a second force feedback value $T_2$ as the force feedback value $T_f$. The second force feedback value $T_2$ can be a constant. In an embodiment, the first force feedback value $T_1$ is greater than the second force feedback value $T_2$, and the second force feedback value $T_2$ can be greater or slightly greater than the third force feedback value $T_3$ to remind the user that the tool 122 is processing on the workpiece 142.

Sixth Embodiment

Figure 11:
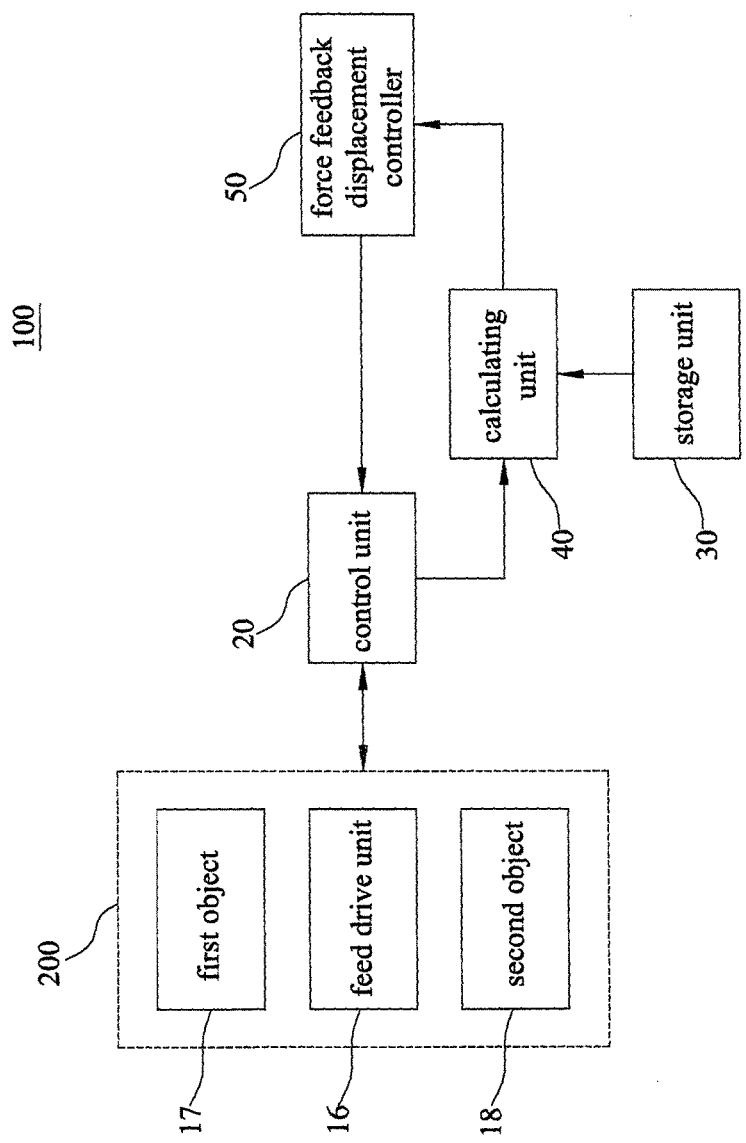
FIG. 11 is a schematic diagram illustrating the system architecture of a sixth embodiment according to the present disclosure.

Referring to FIG. 11, a schematic diagram illustrating the system architecture of a sixth embodiment of the present disclosure is shown. The sixth embodiment is an apparatus 100 for providing force feedback, and has a system architecture similar to that of the first embodiment, except that the tool holder 12 is replaced by a first object 17, the base 14 is replaced by a second object 18, and the machine tool 10 is replaced by a mobile platform 200. In other embodiments, the first object 17 and the second object 18 can be of the following combinations: a structural member and a base, a structure member and a tool holder, a structural member and another structural member, and a tool holder and a jig. In the sixth embodiment, the jig 144 or the structural member 146 is replaced by a third object; the tool 122 is replaced by a fourth object; the workpiece 142 is replaced by a fifth object; the MPG 52 of the force feedback displacement controller 50 is replaced by a displacement unit; the unprocessed scenario is replaced by a first mode; and the work-in-process scenario is replaced by a second mode. Therefore, the methods described in relation to the first embodiment to the fifth embodiment are all applicable to the sixth embodiment after the names are replaced as just described. Thus, the apparatus 100 for providing force feedback can also be applied to none machine tool fields, such as in the virtual education or games. In other words, the sixth embodiment is a generalization of the first embodiment.

Seventh Embodiment

Figure 12:
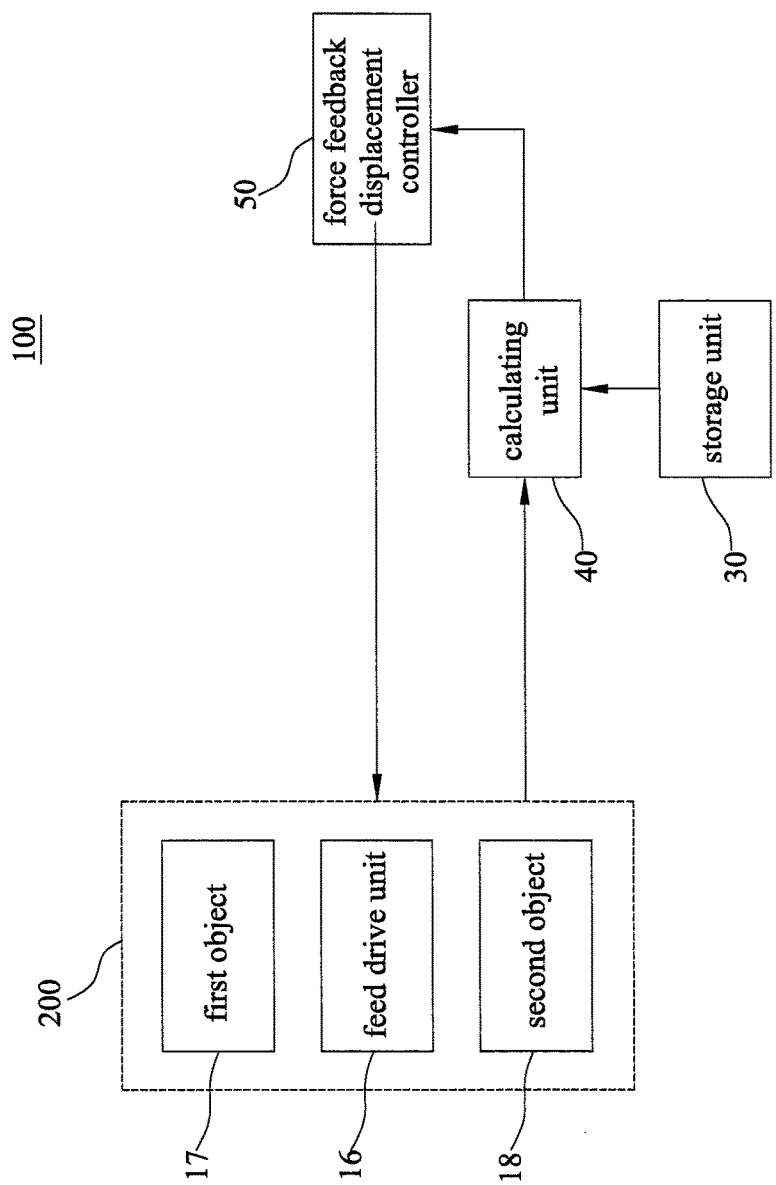
FIG. 12 is a schematic diagram illustrating the system architecture of a seventh embodiment according to the present disclosure.

Referring to FIG. 12, a schematic diagram illustrating the system architecture of a seventh embodiment of the present disclosure is shown. The system architecture of the seventh embodiment is similar to that of the sixth embodiment, except that the control unit 20 is removed, and the calculating unit 40 directly reads the relative position information and the relative velocity information of the first object 17 and the second object 18, and the force feedback displacement controller 50 directly controls the feed drive unit 16 to allow relative movements of the first object 17 and the second object 18.

Figure 13:
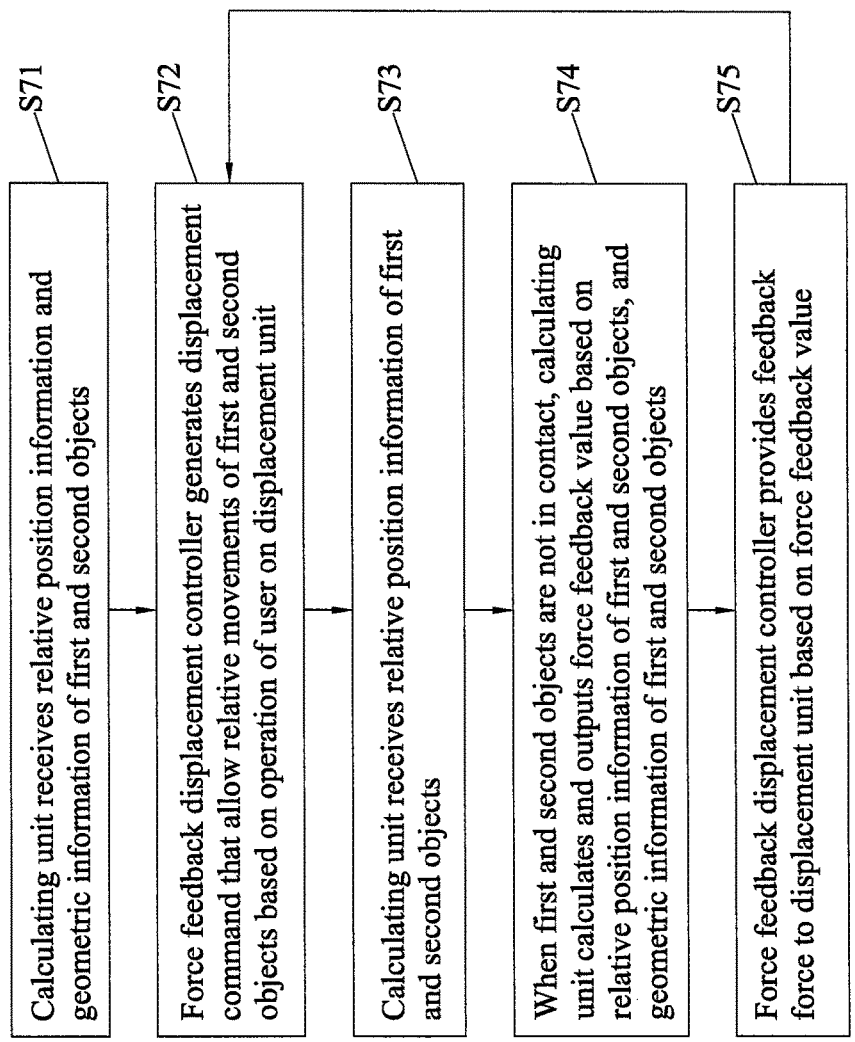
FIG. 13 is a flowchart illustrating the seventh embodiment according to the present disclosure.

Referring to FIG. 13, a flowchart illustrating the seventh embodiment of the present disclosure is shown. The seventh embodiment provides a method for providing force feedback, and has steps S71, S73-S75 similar to step S11, S14-S16 of the first embodiment, respectively. Only the main differences are described as follow.

In step S72, since there is no control unit 20, the force feedback displacement controller 50 generates a displacement command to allow the first and second objects to move with respect to each other based on an operation of the user on the displacement unit.

In step S73, since there is no control unit 20, the calculating unit 40 directly receives the relative position information of the first and the second objects.

Thus, the methods described in relation to the first embodiment to the fifth embodiment are all applicable to the seventh embodiment after replacing the names in accordance with the descriptions in the sixth embodiment and replacing the output and input functions of the control unit 20 with the force feedback displacement controller 50 and the calculating unit 40, respectively.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. A machine tool system, comprising:
   a tool holder arranged to hold a tool;
   a base arranged to carry a workpiece;
   a control unit arranged to control relative movements of the tool holder and the base based on a displacement command, and to output relative position information of the tool holder and the base;
   a storage unit arranged to store geometric information of the tool holder and the base;
   a calculating unit electrically connected with the control unit and the storage unit and arranged to receive the relative position information of the tool holder and the base and the geometric information of the tool holder and the base, and to calculate a force feedback value based on the relative position information of the tool holder and the base and the geometric information of the tool holder and the base when the tool holder is not in contact with the base; and
   a force feedback displacement controller electrically connected with the control unit and the calculating unit and arranged to output the displacement command, and to receive the force feedback value, the force feedback displacement controller including:
      a manual pulse generator configured to generate the displacement command based on an operation of a user; and
      a force feedback unit coupled with the manual pulse generator and configured to provide a feedback force to the manual pulse generator based on the force feedback value, wherein the feedback force and a distance between the tool holder and the base have an inverse association,
   wherein the calculating unit calculates a shortest distance between the tool holder and the base based on the relative position information of the tool holder and the base, and the geometric information of the tool holder and the base, and uses the shortest distance between the tool holder and the base as a distance computed value to calculate the force feedback value, and the distance computed value and the force feedback value have an inverse association.

2. The machine tool system of claim 1, wherein if the distance computed value is greater than a distance threshold, the calculating unit further uses another force feedback value as the force feedback value.

3. The machine tool system of claim 1, further comprising a jig provided on the base, wherein the storage unit further stores and outputs geometric information of the jig and relative position information of the jig and the base to the calculating unit, if the tool holder and the jig are not in contact, the calculating unit further calculates a shortest distance between the tool holder and the jig based on the relative position information of the jig and the base, and the geometric information of the jig, and further uses the shorter one of the shortest distance between the tool holder and the base and the shortest distance between the tool holder and the jig as the distance computed value to calculate the force feedback value, and if the tool holder and the jig are in contact, the calculating unit further uses a first force feedback value as the force feedback value.

4. The machine tool system of claim 1, further comprising a structural member, wherein the storage unit further outputs geometric information of the structural member and relative position information of the structural member and the base to the calculating unit, if the tool holder and the structural member are not in contact, the calculating unit further calculates a shortest distance between the tool holder and the structural member based on the relative position information of the structural member and the base, and the geometric information of the structural member, and further uses the shorter one of the shortest distance between the tool holder and the base and the shortest distance between the tool holder and the structural member as the distance computed value to calculate the force feedback value, and if the tool holder and the structural member are in contact, the calculating unit further uses a first force feedback value as the force feedback value.

5. The machine tool system of claim 4, wherein the structural member further includes a turret, a bellows, a sheet metal cover or an automatic tool change machine.

6. The machine tool system of claim 1, wherein the control unit further outputs relative velocity information between the tool holder and the base to the calculating unit, the calculating unit further calculates the force feedback value based on the relative velocity information between the tool holder and the base, and the relative velocity information between the tool holder and the base and the force feedback value have a positive association.

7. The machine tool system of claim 1, wherein the control unit further outputs relative velocity information between the tool holder and the base to the calculating unit.

8. The machine tool system of claim 7, wherein the calculating unit further calculates the force feedback value based on the relative velocity information between the tool holder and the base, and the relative velocity information between the tool holder and the base and the force feedback value have a positive association.

9. The machine tool system of claim 1, wherein the storage unit further outputs geometric information of the tool and relative position information of the tool and the tool holder to the calculating unit, and if the machine tool system is not processing and the tool and the base are not in contact, the calculating unit further calculates a shortest distance between the tool and the base based on the relative position information of the tool and the tool holder and the geometric information of the tool, and calculates the force feedback value based on the shortest distance between the tool and the base.

10. The machine tool system of claim 9, wherein the storage unit further outputs initial geometric information of the workpiece and relative position information of the workpiece and the base to the calculating unit, the calculating unit further uses the initial geometric information of the workpiece as geometric information of the workpiece, and if the machine tool system is not processing and the tool and the workpiece are not in contact, the calculating unit further calculates a shortest distance between the tool and the workpiece based on the relative position information of the workpiece and the base and the geometric information of the workpiece, and further uses the shorter one of the shortest distance between the tool and the base and the shortest distance between the tool and the workpiece as a distance computed value to calculate the force feedback value.

11. The machine tool system of claim 10, wherein if the machine tool system is processing, the calculating unit further calculates a relative complement of the geometric information of the tool with respect to the geometric information of the workpiece based on the relative position information of the tool and the workpiece, the geometric information of the tool, and the geometric information of the workpiece, and replaces the geometric information of the workpiece with the relative complement of the geometric information of the tool with respect to the geometric information of the workpiece.

12. The machine tool system of claim 10, if the machine tool system is processing and the tool and the workpiece are in contact, the calculating unit further uses a second force feedback value as the force feedback value.

13. The machine tool system of claim 1, wherein the force feedback displacement controller further includes a feed rate setup unit that outputs a feed rate to the calculating unit, the calculating unit calculates the force feedback value based on the feed rate, and the feed rate and the force feedback value have a positive association.

14. The machine tool system of claim 13, wherein the feed rate is output from the feed rate setup unit to the control unit, and the control unit then outputs the feed rate to the calculating unit.

15. The machine tool system of claim 1, wherein if the tool holder and the base are in contact, the calculating unit further uses a first force feedback value as the force feedback value.

16. An apparatus for providing a feedback force, comprising:
a calculating unit arranged to receive relative position information of a first object and a second object and geometric information of the first object and the second object, and to output a force feedback value based on the relative position information of the first object and the second object and the geometric information of the first object and the second object if the first object and the second object are not in contact; and
a force feedback displacement controller electrically connected with the calculating unit and arranged to output a displacement command, and to receive the force feedback value, the displacement command allowing the first object to move with respect to the second object, the force feedback displacement controller including:
a displacement unit configured to generate the displacement command based on an operation of a user; and
a force feedback unit coupled with the displacement unit and configured to provide a feedback force to the displacement unit based on the force feedback value, wherein the feedback force and a distance between the tool holder and the base have an inverse association.

17. The apparatus of claim 16, wherein the calculating unit calculates a shortest distance between the first object and the second object based on the relative position information of the first object and the second object and the geometric information of the first object and the second object, and further uses the shortest distance between the first object and the second object as a distance computed value to calculate the force feedback value, and the distance computed value and the force feedback value have an inverse association.

18. The apparatus of claim 17, wherein if the distance computed value is greater than a distance threshold, the calculating unit further uses a third force feedback value as the force feedback value.

19. The apparatus of claim 17, wherein the calculating unit further receives geometric information of a third object and relative position information of the third object and the second object, if the first object and the third object are not in contact, the calculating unit further calculates a shortest distance between the first object and the third object based on the relative position information of the third object and the second object and the geometric information of the third object, and further uses the shorter one of the shortest distance between the first object and the second object and the shortest distance between the first object and the third object as the distance computed value to calculate the force feedback value, and if the first object and the third object are in contact, the calculating unit further uses a first force feedback value as the force feedback value.

20. The apparatus of claim 17, wherein the calculating unit further receives relative velocity information between the first object and the second object, and further calculates the force feedback value based on the relative velocity information between the first object and the second object, and the relative velocity information between the first object and the second object and the force feedback value have a positive association.

21. The apparatus of claim 16, wherein the calculating unit further receives relative velocity information between the first object and the second object, and further calculates the force feedback value based on the relative velocity information between the first object and the second object, and the relative velocity information between the first object and the second object and the force feedback value have a positive association.

22. The apparatus of claim 16, wherein the calculating unit further receives geometric information of a fourth object and relative position information of the fourth object and the first object, and if the apparatus is in a first mode and the fourth object and the second object are not in contact, the calculating unit further calculates a shortest distance between the fourth object and the second object based on the relative position information of the fourth object and the first object and the geometric information of the fourth object as a distance computed value, and further calculates the force feedback value based on the distance computed value.

23. The apparatus of claim 22, wherein the calculating unit further receives initial geometric information of a fifth object and relative position information of the fifth object and the second object, the calculating unit further uses the initial geometric information of the fifth object as geometric information of the fifth object, and if the apparatus is in a first mode and the fourth object and the fifth object are not in contact, the calculating unit further calculates a shortest distance between the fourth object and the fifth object based on the relative position information of the fifth object and the second object and the geometric information of the fifth object, and further uses the shorter one of the shortest distance between the fourth object and the second object and the shortest distance between the fourth object and the fifth object as the distance computed value to calculate the force feedback value.

24. The apparatus of claim 23, wherein if the apparatus is in a second mode, the calculating unit further calculates a relative complement of the geometric information of the fourth object with respect to the geometric information of the fifth object based on the relative position information of the fourth object and the fifth object, and the geometric information of the fourth object and the fifth object, and further replaces the geometric information of the fifth object with the relative complement of the geometric information of the fourth object with respect to the geometric information of the fifth object.

25. The apparatus of claim 23, wherein if the apparatus is in a second mode and the fourth object and the fifth object are in contact, the calculating unit further uses a second force feedback value as the force feedback value.

26. The apparatus of claim 16, wherein the force feedback displacement controller further includes a feed rate setup unit that outputs a feed rate to the calculating unit, the calculating unit calculates the force feedback value based on the feed rate, and the feed rate and the force feedback value have a positive association.

27. The apparatus of claim 26, further comprising a control unit electrically connected with the calculating unit and the force feedback displacement controller, wherein the feed rate is output from the feed rate setup unit to the control unit, the control unit outputs the feed rate to the calculating unit, the displacement command is output from the force feedback displacement controller to the control unit, and the control unit controls the relative movements of the first object and the second object.

28. The apparatus of claim 16, wherein if the first object and the second object are in contact, the calculating unit further uses a first force feedback value as the force feedback value.

29. A method for providing a feedback force, comprising:
receiving, by using a calculating unit, relative position information of a first object and a second object and geometric information of the first object and the second object;
outputting, by using a displacement unit of a force feedback displacement controller, a displacement command to allow the first object to move with respect to the second object;
calculating and outputting, by using the calculating unit, a force feedback value based on the relative position information of the first object and the second object and the geometric information of the first object and the second object to the force feedback displacement controller if the first object and the second object are not in contact; and
providing, by using a force feedback unit coupled with the displacement unit, a feedback force to the displacement unit based on the force feedback value, wherein the feedback force and a distance between the tool holder and the base have an inverse association.

30. The method of claim 29, wherein the calculating unit calculates a shortest distance between the first object and the second object based on the relative position information of the first object and the second object and the geometric information of the first object and the second object, and further uses the shortest distance between the first object and the second object as a distance computed value to calculate the force feedback value, and the distance computed value and the force feedback value have an inverse association.

31. The method of claim 30, wherein if the distance computed value is greater than a distance threshold, the calculating unit further uses a third force feedback value as the force feedback value.

32. The method of claim 30, wherein the calculating unit further receives geometric information of a third object and relative position information of the third object and the second object, if the first object and the third object are not in contact, the calculating unit further calculates a shortest distance between the first object and the third object based on the relative position information of the third object and the second object and the geometric information of the third object, and further uses the shorter one of the shortest distance between the first object and the second object and the shortest distance between the first object and the third object as the distance computed value to calculate the force feedback value, and if the first object and the third object are in contact, the calculating unit further uses a first force feedback value as the force feedback value.

33. The method of claim 30, wherein the calculating unit further receives relative velocity information between the first object and the second object, and further calculates the force feedback value based on the relative velocity information between the first object and the second object, and the relative velocity information between the first object and the second object and the force feedback value have a positive association.

34. The method of claim 29, wherein the calculating unit further receives relative velocity information between the first object and the second object and further calculates the force feedback value based on the relative velocity information between the first object and the second object, and the relative velocity information between the first object and the second object and the force feedback value have a positive association.

35. The method of claim 29, wherein the calculating unit further receives geometric information of a fourth object and relative position information of the fourth object and the first object, and if a first mode is executing and the fourth object and the second object are not in contact, the calculating unit further calculates a shortest distance between the fourth object and the second object based on the relative position information of the fourth object and the first object and the geometric information of the fourth object as a distance computed value, and further calculates the force feedback value based on the distance computed value.

36. The method of claim 35, wherein the calculating unit further receives initial geometric information of a fifth object and relative position information of the fifth object and the second object, and further uses the initial geometric information of the fifth object as the geometric information of the fifth object, and if a first mode is executing and the fourth object and the fifth object are not in contact, the calculating unit further calculates a shortest distance between the fourth object and the fifth object based on the relative position information of the fifth object and the second object and the geometric information of the fifth object, and further uses the shorter one of the shortest distance between the fourth object and the second object and the shortest distance between the fourth object and the fifth object as the distance computed value to calculate the force feedback value.

37. The method of claim 36, when a second mode is executing, the calculating unit further calculates a relative complement of the geometric information of the fourth object with respect to the geometric information of the fifth object based on the relative position information of the fourth object and the fifth object, and the geometric information of the fourth object and the fifth object, and further replaces the geometric information of the fifth object with the relative complement of the geometric information of the fourth object with respect to the geometric information of the fifth object.

38. The method of claim 36, if a second mode is executing and the fourth object and the fifth object are in contact, the calculating unit further uses a second force feedback value as the force feedback value.

39. The method of claim 29, further comprising outputting, by using a feed rate setup unit of the force feedback displacement controller, a feed rate to the calculating unit, wherein the calculating unit further calculates the force feedback value based on the feed rate, and the feed rate and the force feedback value have a positive association.

40. The method of claim 39, wherein the feed rate is output from the feed rate setup unit to a control unit, and the control unit then outputs the feed rate to the calculating unit.

41. The method of claim 29, wherein if the first object and the second object are in contact, the calculating unit further uses a first force feedback value as the force feedback value.

\* \* \* \* \*